(12) United States Patent
Goguin et al.

(10) Patent No.: US 11,888,987 B2
(45) Date of Patent: Jan. 30, 2024

(54) METHOD AND SYSTEM FOR DIGITAL VOTING USING A TRUSTED DIGITAL VOTING PLATFORM

(71) Applicant: The Pitroda Group LLC., Oakbrook Terrace, IL (US)

(72) Inventors: Alexandre Goguin, Paris (FR); Satyan Pitroda, Oakbrook Terrace, IL (US); Rakesh Patel, Westmont, IL (US)

(73) Assignee: The Pitroda Group LLC., Oakbrook Terrace, IL (US)

( * ) Notice: Subject to any disclaimer, the term of this patent is extended or adjusted under 35 U.S.C. 154(b) by 338 days.

(21) Appl. No.: 17/406,857

(22) Filed: Aug. 19, 2021

(65) Prior Publication Data

US 2022/0060329 A1 Feb. 24, 2022

Related U.S. Application Data

(60) Provisional application No. 63/067,626, filed on Aug. 19, 2020.

(51) Int. Cl.
| | | |
|---|---|---|
| *H04L 9/32* | (2006.01) | |
| *H04L 9/30* | (2006.01) | |
| *G06F 21/64* | (2013.01) | |
| *H04L 9/00* | (2022.01) | |

(52) U.S. Cl.
CPC ............ *H04L 9/321* (2013.01); *G06F 21/645* (2013.01); *H04L 9/30* (2013.01); *H04L 9/3247* (2013.01); *H04L 9/50* (2022.05); *G06Q 2230/00* (2013.01); *H04L 2209/463* (2013.01)

(58) Field of Classification Search
None
See application file for complete search history.

(56) References Cited

U.S. PATENT DOCUMENTS

| | | | |
|---|---|---|---|
| 11,069,170 B2 * | 7/2021 | Zhang | G06F 21/6263 |
| 2017/0109955 A1 * | 4/2017 | Ernest | H04L 9/321 |
| 2018/0102013 A1 * | 4/2018 | Spanos | H04L 9/3239 |
| 2019/0051079 A1 * | 2/2019 | Venkataraman | H04L 9/3239 |
| 2020/0258338 A1 * | 8/2020 | Goswami | H04L 9/3247 |

\* cited by examiner

*Primary Examiner* — Benjamin E Lanier
(74) *Attorney, Agent, or Firm* — CHIP LAW GROUP

(57) ABSTRACT

Provided is a method and system for digital voting. A digital voting system includes a Voting Administration (VA), a Trusted Third Party (TTP), a Voter and a digital voting platform which implements a Voting Chain (VC) as a Blockchain containing multiple blocks that have "roles". These blocks include a Genesis block, a Campaign block, a Voter block, a Voting block, and a Legitimacy block. The VC contains data that is linked to an operation in the voting cycle, assigns tasks to a specific entity and establishes rules to ensure a highly secure pattern of actions and roles. The VA declares itself to the TTP, enrolls voters, releases ballots, starts election cycles using different blocks, and authenticates Voter IDs. The Voter discloses its Public Key to the TTP, casts and checks votes. The TTP registers Public Keys on the VC, verifies signatures, ensures anonymity, and registers ballots and votes.

20 Claims, 3 Drawing Sheets

METHOD AND SYSTEM FOR DIGITAL VOTING USING A TRUSTED DIGITAL VOTING PLATFORM

CROSS-REFERENCE TO RELATED APPLICATIONS/INCORPORATION BY REFERENCE

This application claims priority to, and benefit from U.S. Provisional Application Ser. No. 63/067,626, filed on Aug. 19, 2020, entitled "METHOD AND SYSTEM FOR DIGITAL VOTING USING A TRUSTED DIGITAL VOTING PLATFORM", the entire content of which is hereby incorporated herein by reference in its entirety.

FIELD

Various embodiments of the present disclosure generally relate to digital/electronic voting. Specifically, the present disclosure relates to a method and system for digital voting using a trusted digital voting platform which implements trustworthy messages in network transactions and establishes rules to ensure a highly secure pattern of actions and roles.

BACKGROUND

Digital data transactions and trust rely heavily, if not exclusively, on the simplest cryptographic functions. Such transactions usually require one party to execute a function on some form of data such as, but not limited to, text and image, and transmit the data in its original form accompanied by a secondary chunk of cryptographic data (digital signature computed with a secret private key), or as processed data which is incomprehensible by any reader (encrypted by a secret private key in one version of cryptographic principles).

The trust process relies on a receiver having either the required key to decrypt the data, or, if the data is not secret, the required key to verify that the original data is validated by the secondary chunk of cryptographic data linked exclusively to the original message, thus proving that the message has been issued and signed (the secondary chunk) by an expected third-party that possesses the corresponding private key.

Knowledge of the keys, their authenticity and the secrecy of the private keys used by the communicator of the message is the only challenge since currently no computation power or skill can revert or counterfeit cryptographically processed data or messages.

In the particular problem of an online or electronic voting platform, these elements are the foundation and are the only elements required to ensure that the ballots are communicated by an authorized entity, ensure that a voter has the appropriate voting rights, guarantee that the votes originate from an authorized voter, and preserve privacy (only if the link between the public key and the identity of the voter is broken).

A voting platform is required to implement the aforementioned characteristics not only by securing a network in a usual manner, but by training employees and using best practices/principles attainable by anyone.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for trusted digital voting is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
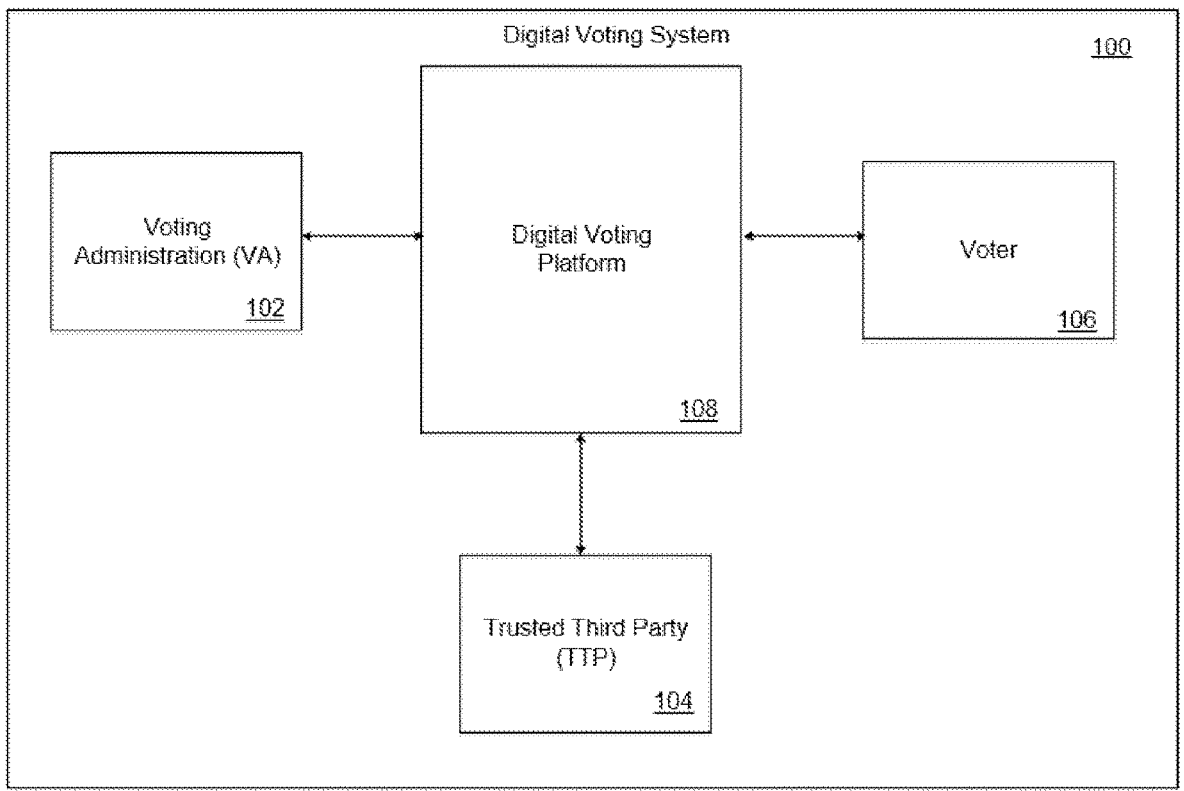
FIG. 1 is a diagram that illustrates a digital voting system for enabling trusted digital voting in accordance with an exemplary embodiment of the disclosure.

The following described implementations may be found in the disclosed method and system for digital voting using a trusted digital voting platform. A digital voting system comprises three entities viz. a Voting Administration (VA), a Trusted Third Party (TTP) and a Voter. The digital voting system includes a digital voting platform which implements a Voting Chain (VC). The VC is implemented as a Blockchain containing a plurality of blocks that have "roles". These blocks include a Genesis block, a Campaign block, a Voter block, a Voting block, and a Legitimacy block. Each entity must process steps at each of these blocks to ensure the security of the digital voting platform. The VC contains data that is linked to a step in the voting cycle and assigns tasks to a specific entity (namely the VA, the TTP or the Voter). The VC further establishes rules to ensure a highly secure pattern of actions and roles that allow the existence of a trustworthy digital voting platform. Every Actor in the digital voting platform uses dedicated tools that ensure the legitimacy of the voting process.

At the VA, the digital voting platform provides a website or an application on a computing device (for example, a tablet or a phone) of the VA. The VA declares itself to the TTP, enrolls voters (the process may be bootstrapped or may issue individual authorizations after examining voter details at a voting booth), releases ballots, and starts election cycles using different blocks of the VC. At the backend, the VA authenticates Voter IDs and sends an authorization via a Short Message Service (SMS) or e-mail, thus implementing security measures in the form of multi-factor authorization such as, but not limited to, two-factor authorization (2FA). At the Voter side, a voter declares themself as a voter via an interface and creates a local Public Key Infrastructure (PKI) that resides on a personal device such as, but not limited to, a phone, tablet, or a computer. Thereafter, the voter discloses his Public Key (PubKey) to the TTP, casts votes and checks votes. The TTP uses automated scripts and maintains a Blockchain which registers Public Keys, verifies signatures, ensures anonymity, registers ballots, registers votes, and waits for instructions from the VA Administrator in order to advance through the voting stages.

In accordance with an embodiment, from the point of view of any voter, the voting process is entirely fulfilled through an application that resides on a personal communication device such as, but not limited to, a phone, a tablet or any mobile device. The application allows a user to enroll as a voter, to receive ballots that are assigned to him/her depending on the restrictions that might exist, to submit these ballots during a time frame that is determined by the VA and to verify if the personal vote that was submitted has been included in the tally. In the same manner, the public nature of the 'database' in the form of a Blockchain, allows a voter to verify entirely the election process: the number of voters, the number of submitted ballots, the authenticity of the ballots and votes, and, the legitimacy of the voters. This verification and accountability operation that any voter or independent structure (for example, Non-Governmental Organizations (NGOs), official institutions, etc.) can undertake through the application that resides on a personal device does not disclose any personal information about the voters and guarantees privacy and authenticity of the voting process as long as two conditions are met:

An initial operation discloses the cryptographic identity of the institutions taking part in the election process.

A trusted institution separates, deletes and forgets any references to any real-life identity data (such as a Voter ID) of a voter, such that no link may be established to the voter's cryptographic identity (Public Key).

The cryptographic identity of a voter or an institution is materialized by a sequence of random characters (publicly known, the Public Key) which are created personally and which have a private counterpart (the Private Key) that is never disclosed and is always used in conjuncture with the public part. The mathematical properties of these two keys allow a user to sign a message and guarantees to other users that this message originates from the user that issues the signature.

The entire process of this trust based on cryptographic keys is described by the method and system of the present disclosure and allows the existence of a trusted digital voting platform. In order to fulfill the required conditions implementing this trust process and the voting platform itself, the following operations are implemented:

A user installs a dedicated application on a personal device. The user receives text messages (or e-mails) and is in sole possession of a password to unlock the application and decrypt the key pairs that the user creates.

The user enters a master password while installing the application. This password is used to encrypt locally data that may include, but are not limited to, key pairs, ballots, and votes before they are submitted to the institutions.

The user sends a request to enroll as a voter to a VA through the application on the device by submitting a (secret) Voter ID.

The VA authorizes the user to become a voter by verifying that the received voter ID is present in a private internal database. This operation can also be fulfilled by the user presenting a valid ID (such as, but not limited to, a driving license) to a clerk at a voting booth. The VA also has a reference to the phone number or e-mail of the user in its internal database as well as a restriction identifier (sequence of characters) which depends on the user's residence or any other restriction condition that are linked to the ballots that the user is allowed to vote for.

The VA then sends a validation code by text to the user's device or by e-mail (or rejects the request if the Voter ID is invalid).

The user becomes a voter when the user receives the message with the validation code as well as a signed authorization by the VA and once the user submits this validation code to the VA. The authorization is formed by the VA and signed by the Private Key the VA stores securely. Thus, the voter and any external entity may verify that the authorization was issued by the VA since the Public Key is known and trusted by all.

The VA releases ballots which are loaded from a remote server to the voter's application on the personal device. These ballots are also signed by the VA implying the authenticity of the ballots.

In the final operations of the process, voters submit their filled ballots by the application on their device with an attached signature formed by their Private Key. Once this signed ballot is disclosed, the ballot is verified that it is authentic and released by an authorized voter, since the digital identity of the voter in the form of the voter's Public Key appears in the Blockchain.

Detailed information of the aforementioned operations and transactions between the participating entities in the voting process are described in accordance with various embodiments of the present disclosure.

FIG. 1 is a diagram that illustrates a digital voting system for enabling trusted digital voting in accordance with an exemplary embodiment of the disclosure. Referring to FIG. 1, there is shown a digital voting system 100 which includes a Voting Administration (VA) 102, a Trusted Third Party (TTP) 104, a Voter 106, and a digital voting platform 108.

The VA 102 may refer to any individual or an entity such as, but not limited to, a town hall, or a university. The VA 102 may be associated with one or more computing devices such as, but not limited to, one or more servers, desktop computers, laptop computers, mobile devices, smart phones or any other type of device, that may comprise suitable logic, circuitry, interfaces and/or code/scripts that may be operable to process data, communicate and/or exchange messages with the TTP 104 and the Voter 106 vis-à-vis the digital voting platform 108.

The VA 102 includes a private database which registers the voters and the corresponding Restriction Hashes (RHs). The VA 102 consists of a private database which includes a list of users who can become voters and their corresponding RHs. This database is internal and never shared or used by the digital voting platform 108. Therefore, this database may include any information the VA 102 requires or maintains, including personal or private details. The VA 102 defines a non-unique RH and a unique Voter ID for each voter corresponding to a ballot, for authorization of the voters. The VA 102 comprises a private database which registers the voters and the corresponding RHs.

The VA 102 owns a secret API Key that is issued by the TTP 104 (such as, for example, the Elections Committee) and is used only once to declare the VA 102 to the TTP 104. Each location associated with a VA has a dedicated and unique API Key. The secret API Key is sent to the TTP 104 along with a cryptographic Public Key associated with the location of the VA 102. The corresponding cryptographic Private Key is kept a secret, and is stored securely by the VA 102, and is never shared. By sharing the secret API Key with the TTP 104, the VA 102 declares itself as an entity allowed to submit ballots and to authorize users to vote for certain ballots.

In operation, the VA 102 initiates a location-independent voting cycle vis-à-vis the digital voting platform 108, from any physical location having dedicated ballots for qualified voters who can vote on certain ballots. The authorization of a user to vote on a ballot is defined by a RH that is non-unique for each ballot and attached to certain voters. The voters can be attached to multiple RHs such that the voters are able to submit multiple ballots. The voters may be attached to a single non-unique RH restricting the vote to ballots represented by the mentioned RH. In order to implement privacy, there may be many voters attached to a certain RH. The VA 102 defines a non-unique RH and a unique Voter ID for each voter corresponding to a ballot, for authorization of the voters.

The TTP 104 may refer any individual or an entity such as, but not limited to, an NGO, the Elections Committee, or the State. The TTP 104 may be associated with one or more computing devices such as, but not limited to, one or more servers, desktop computers, laptop computers, mobile devices, smart phones or any other type of device, that may comprise suitable logic, circuitry, interfaces and/or code/scripts that may be operable to process data, communicate and/or exchange messages with the VA 102 and the Voter 106 vis-à-vis the digital voting platform 108.

The Voter 106 may refer to any user or individual who votes or who has a legal right to vote, especially in an election. The Voter 106 may be associated with one or more computing devices such as, but not limited to, one or more servers, desktop computers, laptop computers, mobile devices, smart phones or any other type of device, that may comprise suitable logic, circuitry, interfaces and/or code/scripts that may be operable to process data, communicate and/or exchange messages with the VA 102 and the TTP 104 vis-à-vis the digital voting platform 108.

The digital voting platform 108 may comprise suitable logic, and/or interfaces, that may be configured to store instructions (for example, computer readable program code) that can implement various aspects of the present disclosure.

The digital voting platform 108 implements a Voting Chain (VC). The VC is implemented as a Blockchain containing a plurality of blocks that have "roles". These blocks include a Genesis block, a Campaign block, a Voter block, a Voting block, and a Legitimacy block. Each entity, the VA 102, the TTP 104 and the Voter 106, must process operations at each of these blocks to ensure the security of the digital voting platform 108. The VC contains data that is linked to an operation in the voting cycle and assigns tasks to a specific entity. The VC further establishes rules to ensure a highly secure pattern of actions and roles that allow the existence of the trustworthy digital voting platform 108. Every Actor in the digital voting platform 108 uses dedicated tools that ensure the legitimacy of the voting process.

The Voter 106 uses an application on a digital device to perform the following functions: load and update the VC, sign messages, and encrypt information on the local device.

The VA 102 uses an application or a website to perform the following functions: construct text-based ballots, sign messages, compute non-unique Restriction Hashes for voters using a minimal set of information in a private database.

The TTP 104 verifies digital signatures, updates the VC according to the roles that the current block in the VC defines and breaks the chronology of messages.

The digital voting platform 108 also employs open access VC tools such as an application or a website for auditing the legitimacy of the voting cycles and determining results and accountability.

Figure 2:
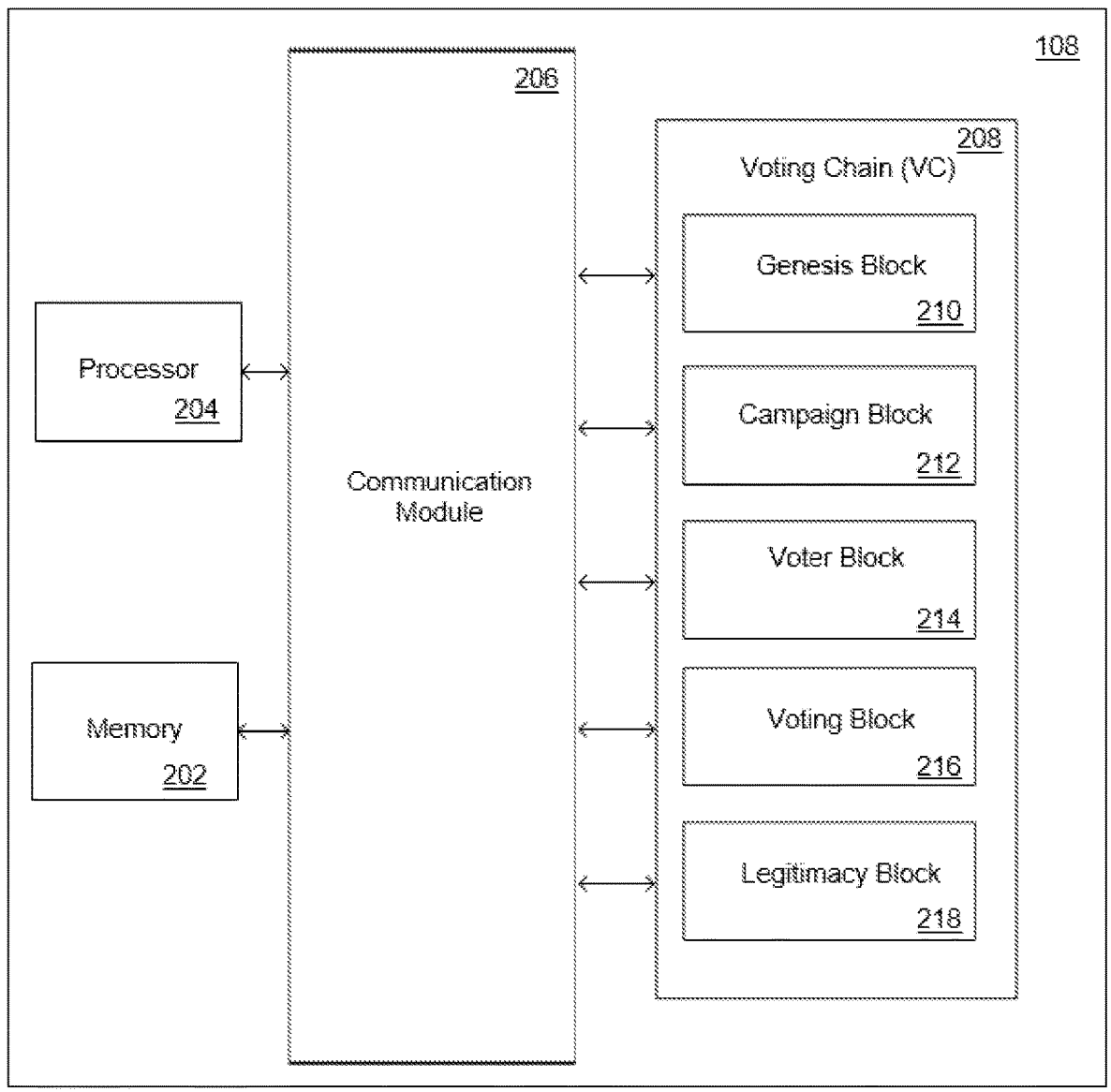
FIG. 2 is a diagram that illustrates various components of a digital voting platform for enabling trusted digital voting in accordance with an exemplary embodiment of the disclosure.

The digital voting platform 108 and a detailed view of the operations that each entity must process to ensure the security of the digital voting platform 108 are further illustrated in conjunction with FIG. 2.

FIG. 2 is a diagram that illustrates various components of a digital voting platform for enabling trusted digital voting in accordance with an exemplary embodiment of the disclosure. Referring to FIG. 2, there is shown the digital voting platform 108 which includes a memory 202, a processor 204, a communication module 206, a Voting Chain (VC) 208, a Genesis block 210, a Campaign block 212, a Voter block 214, a Voting block 216, and a Legitimacy block 218.

The memory 202 may comprise suitable logic, and/or interfaces, that may be configured to store instructions (for example, computer readable program code) that can implement various aspects of the present disclosure.

The processor 204 may comprise suitable logic, interfaces, and/or code that may be configured to execute the instructions stored in the memory 202 to implement various functionalities of the digital voting platform 108 in accordance with various aspects of the present disclosure. The processor 204 may be further configured to communicate with various modules of the digital voting platform 108 via the communication module 206.

The communication module 206 may comprise suitable logic, interfaces, and/or code that may be configured to transmit data between modules, engines, databases, memories, and other components of the digital voting platform 108 for use in performing the functions discussed herein. The communication module 206 may include one or more communication types and utilizes various communication methods for communication within the digital voting platform 108.

The digital voting platform 108 implements the VC 208. The VC 208 is implemented as a Blockchain. The Blockchain contains a plurality of blocks that have "roles". These blocks include the Genesis block 210, the Campaign block 212, the Voter block 214, the Voting block 216, and the Legitimacy block 218. Each entity, the VA 102, the TTP 104 and the Voter 106, must process operations at each of these blocks to ensure the security of the digital voting platform 108. The VC 208 contains data that is linked to an operation in the voting cycle and assigns tasks to a specific entity. The VC 208 further establishes rules to ensure a highly secure pattern of actions and roles that allow the existence of the trustworthy digital voting platform 108. Every Actor in the digital voting platform 108 uses dedicated tools that ensure the legitimacy of the voting process.

In operation, an install process is executed on the entities and on the digital voting platform 108 to implement various functionalities of the present disclosure. In accordance with an embodiment, the digital voting platform 108 and the install procedure may be based on a Docker image for deployment convenience. The source code is in JavaScript (Nodejs) with native extensions in C for cryptographic functions such as, but not limited to, Advanced Encryption Standard (AES), Elliptic Curve Digital Signature Algorithm (ECDSA), and Secure Hash Algorithms (SHA). This allows for further development with custom C libraries (OpenSSL). The current libraries are based on open source code and are lightly modified. The install procedure uses shell scripts to pull the sources, create the Docker image and the Public/Private cryptographic (for example, ECDSA) keys. The keys may be generated manually by making available an option in the shell script for this purpose. The keys are stored in a secured memory and may reside in the Docker container.

Operations of the VC 208 in relation to the entities, the VA 102, the TTP 104 and the Voter 106, are described as follows.

The Genesis block 210 may comprise suitable logic, interfaces, and/or code that may be configured to instruct the VA 102 to send a secret Application Programming Interface (API) Key to the TTP 104. The secret API Key comprises a Public Key and a digital signature corresponding to the VA 102. The TTP 104, upon receiving the secret API Key, verifies the digital signature and the secret API Key and includes the Public Key in the VC 208.

The VA 102 initiates a voting cycle at the Genesis block 210, which is the first block in the VC 208. The VA 102 can initiate a location-independent voting cycle from any physical location having dedicated ballots for qualified voters who can vote on certain ballots. The authorization of a user to vote on a ballot is defined by a Restriction Hash (RH) that is non-unique for each ballot and attached to certain voters. The voters can be attached to multiple RHs such that the voters are able to submit multiple ballots. The voters may be attached to a single non-unique RH restricting the vote to ballots represented by the mentioned RH. In order to implement privacy, there may be many voters attached to a certain RH. The VA 102 defines a non-unique RH and a unique Voter ID for each voter corresponding to a ballot, for authorization of the voters.

The VA 102 includes a private database which registers the voters and the corresponding RHs. The non-unique RH and the unique Voter ID are stored in a pre-existing database and/or are computed while the Genesis block and the Campaign block are active.

The VA 102 consists of a private database which includes a list of users who can become voters and their corresponding RHs. This database is internal and never shared or used by the digital voting platform 108. Therefore, this database may include any information the VA 102 requires or maintains, including personal or private details. The VA 102 defines a non-unique RH and a unique Voter ID for each voter corresponding to a ballot, for authorization of the voters. The VA 102 comprises a private database which registers the voters and the corresponding RHs. The non-unique RHs and the unique Voter IDs are stored in a pre-existing database and/or are computed while the Genesis block and the Campaign block are active but before the Voter block 214 is active.

The VA 102 owns a secret API Key that is issued by the TTP 104 (such as, for example, the Elections Committee) and is used only once to declare the VA 102 to the TTP 104. Each location associated with a VA has a dedicated and unique API Key. The secret API Key is sent to the TTP 104 along with a cryptographic Public Key associated with the location of the VA 102. The corresponding cryptographic Private Key is kept a secret, and is stored securely by the VA 102, and is never shared. By sharing the secret API Key with the TTP 104, the VA 102 declares itself as an entity allowed to submit ballots only when the Campaign block 212 is active and to authorize users to vote for certain ballots.

The cryptographic Public Keys of multiple VAs are stored in the Genesis block 210. As the number of nodes in the VC 208 increases and new election campaigns are created, there may be additional blocks containing new cryptographic Public Keys associated with new VAs included in the blocks.

In accordance with an embodiment, a globally unique secret ADMIN API Key is also issued to the VA 102. This Key is issued to only one VA. For instance, an administrator is the only VA who can end the declaration operation in the Genesis block 210 and start the voting cycle. This operation is materialized by closing the Genesis block 210 by signing the Genesis block 210 with the cryptographic Private Key of the administrator and generating the next block namely the Campaign block 212.

The Campaign block 212 may comprise suitable logic, interfaces, and/or code that may be configured to instruct the VA 102 to create one or more ballots and submit the one or more ballots with a digital signature to the TTP 104. The TTP 104 verifies the existence of the Public Key in the Genesis block 210 and the validity of the digital signature and saves the one or more ballots to the VC 208.

The Campaign block 212 contains the ballots and the attached RHs which are part of the ballots themselves. The VA 102 declares the ballots that it maintains at the Campaign block 212. This is done by signing the ballots with the corresponding cryptographic Private Keys of the VA 102. The corresponding Public Key is included in the Genesis block 210. Only the signed ballots are legitimate, and the rest of the ballots are illegitimate.

The Voter block 214 may comprise suitable logic, interfaces, and/or code that may be configured to instruct the Voter 106 to send an enrollment request to the VA 102 to enroll in the VC 208 using a dedicated application. The VA 102 communicates an enrollment authorization message to the Voter 106, that is digitally signed by the VA 102, allowing the enrollment of the Voter 106. The digitally signed message includes a Voter ID, and a Restriction Hash (RH).

The enrollment authorization message received from the VA 102 is included in a new message which contains additional information. The additional information includes a Voter Public Key and a digital signature of the new message. The Voter 106 sends the new message to the TTP 104. The TTP 104 verifies the digital signature corresponding to the VA 102 and the Voter 106 in the new message and includes the Voter Public Key, and the Restriction Hash (RH) in the VC 208. The TTP 104 includes the Voter Public Key and the RH in the Voter block 214 by stripping the Voter ID. The Voter ID may not be stored, shared, or transmitted, and may be securely deleted.

The Voter 106 is granted the right to vote on certain ballots (by the corresponding RH) at the Voter block 214. In order to authorize the Voter 106 for enrollment, the VA 102 sends an enrollment authorization message to the Voter 106. The enrollment authorization message is signed by the VA 102's cryptographic Private Key. The corresponding Public Key of the VA 102 is included in the Genesis block 210.

The enrollment authorization message includes a non-unique RH and a unique Voter ID associated with the Voter 106. The Voter 106 sends the authorization enrollment message to the TTP 104 which is augmented by the Voter 106's own cryptographic Public Key and is digitally signed by the Voter 106.

The Voting block 216 may comprise suitable logic, interfaces, and/or code that may be configured to instruct the Voter 106 to digitally sign a ballot and send the ballot to the TTP 104. The TTP 104 verifies the existence of the Voter Public Key in the Voter block 214 of a current voting cycle and includes the ballot in the VC 208 if the digital signature is valid and if the RH corresponding to the ballot is equivalent to the RH assigned to the Voter 106 which is stored in the Voter Block 214. In order to allow the Voter 106 to vote, the RH of the Voter 106 may be computed as a hash from the original RH of a ballot. This one-way function will allow the Voter 106 to submit a vote for multiple ballots only if the hashing function is different for each computation or has a predefined seed disclosed by the VA 102.

In an embodiment, at the TTP 104, the Voter ID or any data related to a voter's real identity appearing in any database is discarded or stripped from the enrollment authorization message communicated by the VA 102, or by the TTP 104 and the cryptographic Public Key and the RH are included in the Voter block 214. There is no link in the VC 208 between the Voter 106's Public Key and the real identity since the Voter ID is stripped from the enrollment authorization message communicated by the VA 102. The TTP 104 and the VA 102 do not exchange any other messages except those defined by the roles. The TTP 104 never transmits messages to the VA 102 or to the Voter 106 and acts only as a receive-only entity that has the sole role to update the VC 208.

Using the cryptographic Public Key, the Voter 106 can vote only for ballots that have the corresponding RH. Only a VA Administrator can close and sign the Voter block 214 and initiate the Voting block 216.

The TTP 104 stalls the release of a block if the release of the block compromises one or more rules of the voting cycle. A rule may include, but is not limited to, releasing one or more votes before the voting cycle is not allowed, and disclosing only partial information related to a number of voters who have submitted one or more ballots.

Further, the TTP 104 randomly shuffles entries in the Voter block 214 and the Voting Block 216 so that a chronological order is not preserved. The TTP 104 verifies if enough identical RHs appear in a block.

The Legitimacy block 218 may comprise suitable logic, interfaces, and/or code that may be configured to instruct the TTP 104 to include one or more original signed messages by the VA 102 in the VC 208. These original signed messages grant voting rights to the Voter 106.

The Legitimacy block 218 is released after the Voting block 216 is closed and released. The Legitimacy block 218 contains one or more authorization messages signed by the VA 102 for enrolment authorization of one or more voters. There may be more than one block for a certain operation (for example, more than one Voter Block 214). The entries in each block may be limited in number by setting an option. The TTP 104 closes and signs the block and initializes a new identical block type. Blocks may be released immediately as entries or are stored or postponed once the operation is closed and signed.

A voting cycle advances by closing a current block at a predefined date, time and/or by a request communicated by the VA 102 or the VA 102 disposing administrator rights, and by releasing a new block in the VC 208.

The operations of the Voting block 216 and the Legitimacy block 218 are transparent to the VA 102.

In accordance with an embodiment, the operations of the VC 208 in relation to the TTP 104 are described as follows.

The TTP 104 creates the Genesis block 210 upon first launch. The TTP 104 waits for the VAs to declare themselves by using the API dedicated keys that the TTP 104 possesses in advance. Only one declaration as VA for each API key is allowed. This operation is the base for the legitimacy of the digital voting platform 108 and may be executed in a closed network. The cryptographic Public Keys associated with the VAs are included in the Genesis block 210.

The VA Administrator (a VA that has the unique ADMIN API Key) closes this operation once the VAs have declared themselves or once a policy allows for this closure. The Genesis block 210 may have a "Live" status flag that reflects a current reality (which may not be signed).

At the Campaign block 212, the TTP 104 waits for messages from entities that have signed messages with a cryptographic Private Key and that which have their corresponding cryptographic Public Key included in the Genesis block 210. The messages contain the ballots. The VA administrator closes this operation upon receiving the messages.

The Voter block 214 may have a "Live" status flag that reflects the current reality (which may not be signed). The VA administrator closes this operation once the ballots are declared.

At the Voter Block 214, the TTP 104 waits for messages from entities that have signed messages with a cryptographic Private Key. The core of these message must contain a message that the entity signed by itself using a cryptographic Private Key that has its corresponding cryptographic Public Key included in the Genesis block 210. This operation ensures that the included message is signed by the VA 102 and reflects the new voting rights assigned to the Voter 106.

The TTP 104 includes the cryptographic Public Key and the RH in the Voter block 214 by stripping the Voter ID. The Voter ID or any data related to a voter's real identity appearing in any database is stripped from the enrollment authorization message communicated by the VA 102, or by the TTP 104. The Voter ID may not be stored, shared, or transmitted, and may be securely deleted.

The Voter block 214 includes a "Restricted" status flag that may not reveal a chronological order (that appears in the Voter Block 214) of voter declarations, since this will reveal the identity of the voters to the VA 102. The Voter block 214 can be revealed once this operation is closed and signed.

Other restrictions are implemented such that the identity of the Voter 106 is not revealed through the non-unique or rare RHs. The VA administrator closes this operation once a date/time is passed. Upon closure, the Voter block 214 is released.

At the Voting block 216, the TTP 104 waits for the entities that have signed messages with a cryptographic Private Key, and that which have a corresponding cryptographic Public Key that appears in the Voter block 214. The message contains the ballots.

The Voting block 216 includes a "Restricted" status to reveal the current votes since this is usually forbidden until the end of the voting process. If the policy allows real-time vote visualization, an option is implemented. The VA administrator closes this operation once a date/time is passed.

The Legitimacy block 218 is released immediately after the Voting block 216 is closed and released. The Legitimacy block 218 contains the messages signed by the VA 102 that includes enrolment authorization (RH; Voter ID) pertaining to the Voter 106. This operation is necessary for accountability.

In accordance with an embodiment, the operations of the VC 208 in relation to the Voter 106 are described as follows.

At the Voter 106, a dedicated application is installed on a computing device of the Voter 106 to enable the functionalities of the present disclosure.

A master password is entered on the computing device of the Voter 106, which is used to encrypt local information that may include, but are not limited to, RHs, cryptographic keys, and temporary or final ballots. In case the password is lost, the Voter 106 will no longer be able to vote unless the corresponding cryptographic Private Key has been saved externally.

In a next operation, an authorization code/unique token is sent by the VA 102 to the computing device of the Voter 106. The authorization code/unique token may be sent using any electronic or digital communication application such as, but not limited to, an SMS or e-mail. The authorization code is entered by the Voter 106 into the application.

The application then receives a message signed by the VA 102. This message contains an RH and a Voter ID corresponding to the Voter 106. The application then sends this message to the TTP 104 after appending the message with the cryptographic Public Key of the Voter 106. The entire message is signed by the secret cryptographic Private Key of the Voter 106.

The operations of both the Genesis block 210 and the Campaign block 212 are transparent to the voters. The voters may read the ballots transmitted before the voting cycle begins.

At the Voter block 214, the Voter 106 has been declared during the operation of application installation. Implicitly, the application installation process and the enrolment are executed after the Campaign block 212 is closed and signed.

At the Voting Block 216, the Voter 106 sends a ballot signed by the cryptographic Private Key of the Voter 106. The ballot contains the corresponding RH which was assigned to the Voter 106 by the VA 102. Thus, voters can verify if their vote is listed, and if it reflects the reality of their vote.

The operations of the Legitimacy Block 218 are transparent to the Voter 106. The Legitimacy block 218 instructs voters to verify if their authorization is listed and if the total number of voters is consistent.

Figure 3:
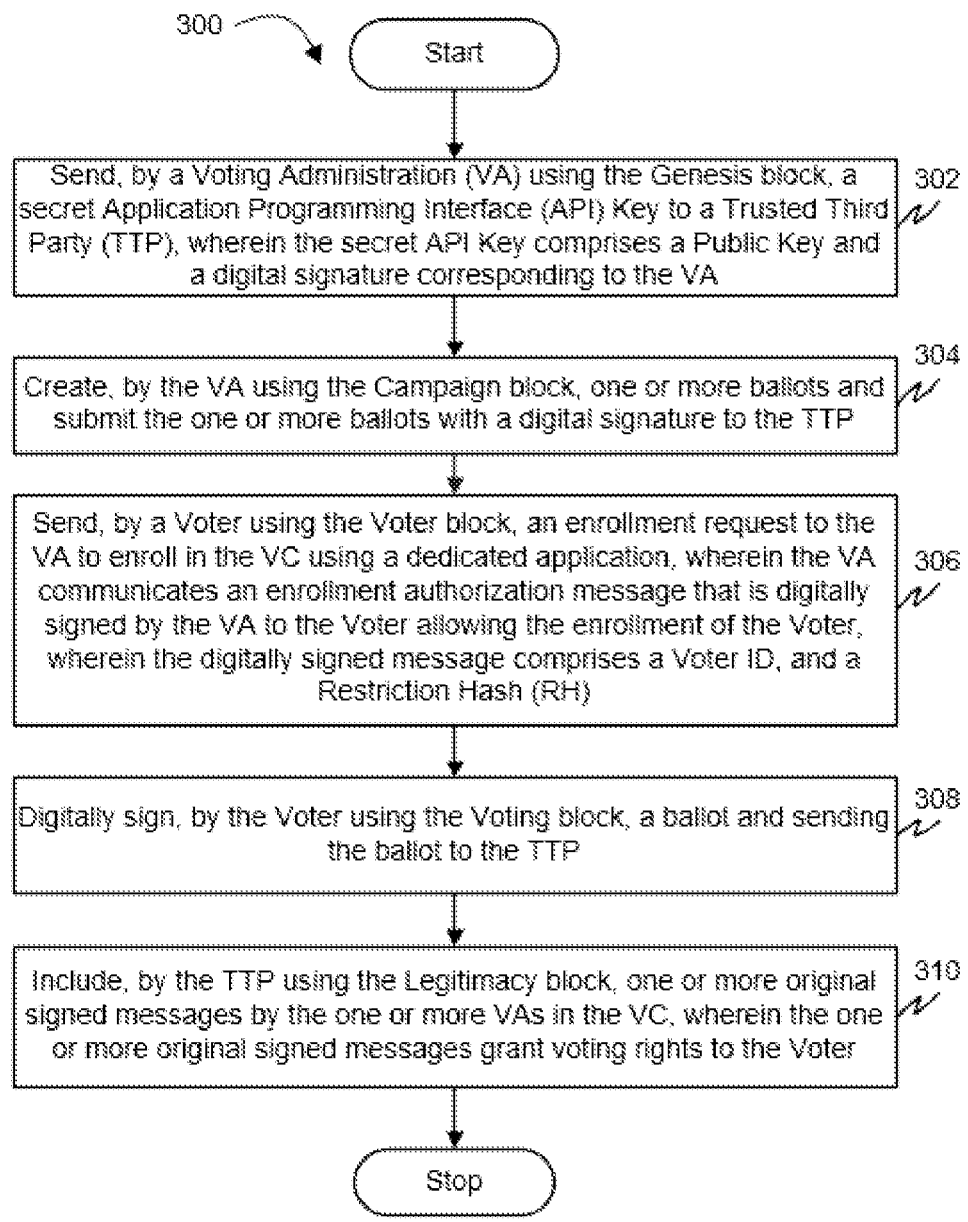
FIG. 3 is a flowchart that illustrates a method for digital voting in the digital voting system in accordance with an exemplary embodiment of the disclosure.

FIG. 3 is a flowchart that illustrates a method for digital voting in the digital voting system in accordance with an exemplary embodiment of the disclosure. Referring to FIG. 3, there is shown a flowchart 300 that illustrates a method for digital voting in the digital voting system 100.

At 302, send, by a Voting Administration (VA) using the Genesis block, a secret Application Programming Interface (API) Key to a Trusted Third Party (TTP), wherein the secret API Key comprises a Public Key and a digital signature corresponding to the VA. The Genesis block 210 instructs the VA 102 to declare itself to the TTP 104 by transmitting the secret API Key issued to the VA 102 by the TTP 104. Upon receiving the secret API key, the TTP 104 verifies the digital signature and the secret API Key and includes the Public Key in the VC 208.

At 304, create, by the VA using the Campaign block, one or more ballots and submit the one or more ballots with a digital signature to the TTP. The Campaign block 212 instructs the VA 102 to digitally sign one or more ballots and submit them to the TTP 104. The TTP 104 then verifies the existence of the Public Key in the Genesis block 210 and checks the validity of the digital signature and saves the one or more ballots to the VC 208.

At 306, send, by a Voter using the Voter block, an enrollment request to the VA to enroll in the VC using a dedicated application, wherein the VA communicates an enrollment authorization message that is digitally signed by the VA to the Voter allowing the enrollment of the Voter, wherein the digitally signed message includes a Voter ID, and a Restriction Hash (RH). The Voter block 214 instructs the Voter 106 to send an enrollment request to the VA 102 using a dedicated application installed on a computing device of the Voter 106. The enrollment authorization message received from the VA 102 is included in a new message containing additional information. The additional information comprises a Voter Public Key and a digital signature of the new message and the new message is sent to the TTP 104. The TTP 104 then verifies the digital signature corresponding to the VA 102 and the Voter 106 in the new message and includes the Voter Public Key, and the Restriction Hash (RH) in the VC 208.

At 308, digitally sign, by the Voter using the Voting block, a ballot and sending the ballot to the TTP. The Voting block 216 instructs the Voter 106 to digitally sign a ballot and submit the ballot to the TTP 104. The TTP 104 verifies the existence of the Voter Public Key in the Voter block 214 of a current voting cycle and includes the ballot in the VC 208 if the digital signature is valid and if the RH corresponding to the ballot is equivalent to the RH assigned to the Voter 106 which is stored in the Voter Block 214.

At 310, include, by the TTP using the Legitimacy block, one or more original signed messages by the one or more VAs in the VC, wherein the one or more original signed messages grant voting rights to the Voter. The Legitimacy block 218 instructs the TTP 104 to include original signed messages from the VAs in the VC 208. The Legitimacy block 218 instructs voters to verify if their authorization is listed and if the total number of voters is consistent.

The functions performed by the subsystems, the VA 102, the TTP 104 and the Voter 106, are further enumerated in conjunction with an exemplary scenario.

In an exemplary scenario where a person (voter) is voting in a National Election, the digital voting platform 108 provides a website or an application to a computing device (for example, a tablet or a phone) of the VA 102. The VA 102 declares itself to the TTP 104 (that may be the National Elections Committee in this case), enrolls the voter (the process may be bootstrapped or may issue individual authorizations after examining the voter's details at a voting booth), releases ballots, and starts election cycles using different blocks of the VC 208.

At the backend, the VA 102 authenticates a Voter ID of the voter and sends an SMS or email authorization thus implementing security measures in the form of multi-factor authorization such as, but not limited to, 2FA. At the voter's side, the voter declares themself as a voter via an interface and creates a local Public Key Infrastructure (PKI) that resides on a personal device of the voter such as, but not limited to, a phone, a tablet, or a computer. Thereafter, the voter declares his Public Key (PubKey) to the National Elections Committee, casts votes and checks votes. The National Elections Committee uses automated scripts and maintains a Blockchain which registers Public Keys, verifies signatures, ensures anonymity, registers ballots, registers votes, and waits for instructions from the VA administrator in order to advance through the voting stages.

The present disclosure is advantageous in that it provides a trusted digital voting platform which implements characteristics such as, but not limited to, ensuring that ballots are communicated by an authorized entity, ensuring that a voter has the appropriate voting rights, guaranteeing that the votes originate from an authorized voter, and preserving privacy. These characteristics are implemented not only by securing a network in a usual manner, but by training employees and using best practices/principles attainable by anyone.

The digital voting platform 108 of the present disclosure implements trustworthy messages in network transactions as long as the (initial) public keys are known, publicly available, immutable and trusted. The system of the present disclosure further establishes rules to ensure a highly secure pattern of actions and roles that allow the existence of the trustworthy digital voting platform 108. Every Actor in the digital voting platform 108 uses dedicated tools that ensure the legitimacy of the voting process.

Throughout the voting process, there is no need for authentication or encryption. The digital voting platform 108 relies on the trust and legitimacy that is granted to the entities and is based on the content of the initial block in the VC 208, the Public Keys of the VA 102 and the TTP 114. The messages and requests for actions are legitimate as long as the digital signature of a message is authentic and cryptographically verified by the signer's Public Key.

There is no link in the VC 208 between the Voter 106's Public Key and the real identity since the Voter ID is stripped from the enrollment authorization message communicated by the VA 102. The TTP 104 and the VA 102 do not exchange any other messages except those defined by the roles. The TTP 104 never transmits messages to the VA 102 or to the Voter 106 and acts as a receive-only entity that has the sole role to update the VC 208.

The digital voting platform 108 does not require any active interaction between the Actors in order to initiate an action or be informed on any pending tasks such as, but not limited to, submission of a vote, or submission of a new ballot. As an example, a voter may at any time download and analyze the VC 208 and decide whether a ballot concerns the specific voter and requires a digitally signed vote to be sent to the TTP 104, which is then included in the VC 208. The tools used by the Actors must have a constantly updated version of the VC 208 and decide if an action is required. The TTP 104 validates actions by comparing the roles defined by a current active block.

The Voter 106 may transfer the PKI and the encrypted data to another device as long as the application password is known. The Voter 106 may either decrypt the information or transfer it as a Binary Large Object (BLOB) of encrypted data. The data may be decrypted and used on the new device using the same secret application password.

There can be many blocks of the same nature in a specific phase of a voting cycle in order to reduce network transactions and releasing a block requires enough entropy to guarantee privacy. In order to further increase privacy inside blocks, the TTP 104 randomly shuffles the entries in the Voter block 214 and the Voting block 216 so that a chronological order is not preserved. The TTP 104 verifies if enough identical Restriction Hashes appear in a block and checks if there is enough buffer and memory in the backend before releasing any concerned block to the VC 208.

The digital voting system 108 of the present disclosure provides a database for registering and listing the data and ensuring the validity of the entire voting process is at the base of the trust chain.

A starting point (Genesis process) that ensures that elements and operations during the voting cycle are valid. This operation can hardly be corrupted since it may be executed at any chosen time by an authorized trusted entity and be made publicly known. The successive data is linked to the fact that the data in the Genesis structure or Genesis block 210 ensures validity and trust of the data. The successive chunks of data that augment the information available in voting campaigns are authentic and can never be counterfeit unless the Genesis block 210 is modified, which is unfeasible.

Further, the digital voting system 108 preserves the secrecy of the Private Keys. There is a trusted (or regulated) entity that can forget the link between the identity of a Voter 106 (Voter ID) and the Public Key of the Voter 106 which is disclosed at the enrollment process by the Voter 106 to the TTP 104. There must be a public repository that the participants or entities trust at least at one point in time, that is, during the Genesis event.

Those skilled in the art will realize that the above recognized advantages and other advantages described herein are merely exemplary and are not meant to be a complete rendering of all of the advantages of the various embodiments of the present disclosure.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system, may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A digital voting system, comprising:
   a processor; and
   a memory coupled to the processor, having stored thereon instructions which, when executed by the processor, cause the processor to implement a digital voting platform;
   a plurality of entities comprising one or more Voting Administrations (VAs), a Trusted Third Party (TTP), and one or more Voters;
   wherein the digital voting platform comprises a Voting Chain (VC) implemented as a Blockchain, wherein the Blockchain comprises a plurality of blocks, wherein each block of the plurality of blocks is associated with a role, wherein the plurality of blocks comprises a Genesis block, a Campaign block, a Voter block, a Voting block, and a Legitimacy block, wherein the VC contains data that is linked to an operation in a voting cycle, and assigns tasks to the plurality of entities, and wherein:
   the Genesis block is configured to instruct a VA of the one or more VAs to send a secret Application Programming Interface (API) Key to the TTP, wherein the secret API Key comprises a Public Key and a digital signature corresponding to the VA, wherein the TTP verifies the digital signature and the secret API Key and includes the Public Key in the VC;

the Campaign block is configured to instruct the VA to create one or more ballots and submit the one or more ballots with a digital signature to the TTP, wherein the TTP verifies existence of the Public Key in the Genesis block and validity of the digital signature, and saves the one or more ballots to the VC;

the Voter block is configured to instruct a Voter of the one or more Voters to send an enrollment request to the VA to enroll in the VC using a dedicated application, wherein the VA communicates an enrollment authorization message that is digitally signed by the VA to the Voter allowing enrollment of the Voter, wherein the digitally signed message comprises a Voter ID, and a Restriction Hash (RH), wherein the enrollment authorization message received from the VA is included in a new message containing additional information and the new message is sent to the TTP, wherein the additional information comprises a Voter Public Key and a digital signature of the new message;

wherein the TTP verifies the digital signature corresponding to the VA and the Voter in the new message and includes the Voter Public Key, and the Restriction Hash (RH) in the VC;

the Voting block is configured to instruct the Voter to digitally sign a ballot and send the ballot to the TTP, wherein the TTP verifies the existence of the Voter Public Key in the Voter block of a current voting cycle and includes the ballot in the VC if the digital signature is valid and if the RH corresponding to the ballot is equivalent to the RH assigned to the Voter which is stored in the Voter Block;

and the Legitimacy block is configured to instruct the TTP to include one or more original signed messages by the one or more VAs in the VC, wherein the one or more original signed messages grant voting rights to the Voter.

2. The digital voting system of claim 1, wherein a VA of the one or more VAs is at least one of a town hall or a university.

3. The digital voting system of claim 1, wherein the TTP is at least one of a Non-Governmental Organization (NGO), the Elections Committee, or the State.

4. The digital voting system of claim 1, wherein a VA of the one or more VAs defines a non-unique RH and a unique Voter ID for each Voter of the one or more Voters corresponding to a ballot, for authorization of the one or more Voters, wherein the VA comprises a private database which registers the one or more Voters and the corresponding RHs, wherein the non-unique RH and the unique Voter ID are stored in a pre-existing database and/or are computed while the Genesis block and the Campaign block are active.

5. The digital voting system of claim 1, wherein the Genesis block instructs a VA of the one or more VAs to declare itself to the TTP using the secret API Key issued to the VA by the TTP, wherein the VA, upon declaration, submits the one or more ballots only when the Campaign block is active and authorizes the one or more Voters to vote on the one or more ballots.

6. The digital voting system of claim 1, wherein the Voter ID or any data related to a real identity of a Voter of the one or more Voters appearing in any database is stripped from the enrollment authorization message communicated by the VA, or by the TTP.

7. The digital voting system of claim 1, wherein the TTP stalls the release of a block of the plurality of blocks if the release of the block compromises one or more rules of the voting cycle, wherein a rule of the one or more rules comprises releasing one or more votes before the voting cycle is not allowed, and disclosing only partial information related to a number of Voters who have submitted one or more ballots.

8. The digital voting system of claim 1, wherein the TTP randomly shuffles entries in the Voter block and the Voting Block so that a chronological order is not preserved, wherein the TTP verifies if enough identical RHs appear in the Voter block and the Voting block.

9. The digital voting system of claim 1, wherein in order to allow a Voter of the one or more Voters to vote, the RH of the Voter is computed as a hash from an original RH of a ballot, wherein the computation is a one-way function to allow the Voter to submit a vote for multiple ballots only if the hashing function is different for each computation or has a predefined seed disclosed by the VA.

10. The digital voting system of claim 1, wherein the Legitimacy block is released after the Voting block is closed and released, wherein the Legitimacy block contains one or more authorization messages signed by the VA for enrolment authorization of the one or more Voters.

11. The digital voting system of claim 1, wherein a voting cycle advances by closing a current block of the plurality of blocks at a predefined date, time and/or by a request communicated by a VA of the one or more VAs or a VA of the one or more VAs disposing administrator rights, and by releasing a new block of the plurality of blocks in the VC.

12. A method for digital voting, the method comprising:
in a digital voting platform, wherein the digital voting platform comprises a Voting Chain (VC) implemented as a Blockchain, wherein the Blockchain comprises a plurality of blocks, wherein each block of the plurality of blocks is associated with a role, wherein the plurality of blocks comprises a Genesis block, a Campaign block, a Voter block, a Voting block, and a Legitimacy block, wherein the VC contains data that is linked to an operation in a voting cycle, and assigns tasks to one or more entities of a plurality of entities, the plurality of entities comprising one or more Voting Administrations (VAs), a Trusted Third Party (TTP), and one or more Voters, sending, by a VA of the one or more VAs using the Genesis block, a secret Application Programming Interface (API) Key to the TTP, wherein the secret API Key comprises a Public Key and a digital signature corresponding to the VA, wherein the TTP verifies the digital signature and the secret API Key and including the Public Key in the VC;

creating, by the VA using the Campaign block, one or more ballots and submitting the one or more ballots with a digital signature to the TTP, wherein the TTP verifies existence of the Public Key in the Genesis block and validity of the digital signature, and saves the one or more ballots to the VC;

sending, by a Voter of the one or more Voters using the Voter block, an enrollment request to the VA to enroll in the VC using a dedicated application, wherein the VA communicates an enrollment authorization message that is digitally signed by the VA to the Voter allowing enrollment of the Voter, wherein the digitally signed message comprises a Voter ID and a Restriction Hash (RH), wherein the enrollment authorization message received from the VA is included in a new message containing additional information and the new message is sent to the TTP, wherein the additional information comprises a Voter Public Key and a digital signature of the new message;

wherein the TTP verifies the digital signature corresponding to the VA and the Voter in the new message and includes the Voter Public Key, and the Restriction Hash (RH) in the VC;

digitally signing, by the Voter using the Voting block, a ballot and sending the ballot to the TTP, wherein the TTP verifies the existence of the Voter Public Key in the Voter block of a current voting cycle and includes the ballot in the VC if the digital signature is valid and if the RH corresponding to the ballot is equivalent to the RH assigned to the Voter which is stored in the Voter Block; and including, by the TTP using the Legitimacy block, one or more original signed messages by the one or more VAs in the VC, wherein the one or more original signed messages grant voting rights to the Voter.

13. The method of claim 12 comprises defining, by a VA of the one or more VAs, a non-unique RH and a unique Voter ID for one or more Voters corresponding to a ballot, for authorization of the one or more Voters, wherein the VA comprises a private database which registers the one or more Voters and the corresponding RHs, wherein the non-unique RH and the unique Voter ID are stored in a pre-existing database and/or are computed while the Genesis block and the Campaign block are active.

14. The method of claim 12 comprises enabling a VA of the one or more VAs using the Genesis block, to declare itself to the TTP using the secret API Key issued to the VA by the TTP, wherein the VA, upon declaration, submits the one or more ballots only when the Campaign block is active and authorizes one or more Voters to vote on the one or more ballots.

15. The method of claim 12, wherein the Voter ID or any data related to a real identity of a Voter of the one or more Voters appearing in any database is stripped from the enrollment authorization message communicated by the VA, or by the TTP.

16. The method of claim 12, wherein the TTP stalls the release of a block of the plurality of blocks if the release of the block compromises one or more rules of the voting cycle, wherein a rule of the one or more rules comprises releasing one or more votes before the voting cycle is not allowed, and disclosing only partial information related to a number of Voters who have submitted one or more ballots.

17. The method of claim 12, wherein the TTP randomly shuffles entries in the Voter block and the Voting Block so that a chronological order is not preserved, wherein the TTP verifies if enough identical RHs appear in the Voter block and the Voting block.

18. The method of claim 12, wherein in order to allow a Voter of the one or more Voters to vote, the RH of the Voter is computed as a hash from an original RH of a ballot, wherein the computation is a one-way function to allow the Voter to submit a vote for multiple ballots only if the hashing function is different for each computation or has a predefined seed disclosed by the VA.

19. The method of claim 12, wherein the Legitimacy block is released after the Voting block is closed and released, wherein the Legitimacy block contains one or more authorization messages signed by the VA for enrolment authorization of the one or more Voters.

20. The method of claim 12, wherein a voting cycle advances by closing a current block of the plurality of blocks at a predefined date, time and/or by a request communicated by a VA of the one or more VAs or a VA of the one or more VAs disposing administrator rights, and by releasing a new block of the plurality of blocks in the VC.

* * * * *